United States Patent
Hori et al.

(10) Patent No.: US 6,827,106 B2
(45) Date of Patent: Dec. 7, 2004

(54) ORIFICE OF FLUID PASSAGE AND ORIFICE CLOGGING PREVENTING MECHANISM

(75) Inventors: Yoshiaki Hori, Saitama (JP); Yoshihiro Yoshida, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 39 days.

(21) Appl. No.: 10/265,572

(22) Filed: Oct. 8, 2002

(65) Prior Publication Data

US 2003/0127143 A1 Jul. 10, 2003

(30) Foreign Application Priority Data

Oct. 12, 2001 (JP) .......................................... 2001-314826

(51) Int. Cl.[7] .............................................. F16K 11/10
(52) U.S. Cl. ..................................... 137/884; 74/606 R
(58) Field of Search ........................... 137/884; 138/40; 74/606 R; 251/117

(56) References Cited

U.S. PATENT DOCUMENTS

| | | | | |
|---|---|---|---|---|
| 4,449,426 A | * | 5/1984 | Younger | ...................... 477/127 |
| 5,649,457 A | * | 7/1997 | Kudou et al. | .............. 74/606 R |
| 5,676,026 A | * | 10/1997 | Tsuboi et al. | .............. 74/606 R |
| 5,887,956 A | * | 3/1999 | Rausch | ..................... 303/119.2 |

\* cited by examiner

Primary Examiner—John Fox
(74) Attorney, Agent, or Firm—Birch, Stewart, Kolasch & Birch, LLP

(57) ABSTRACT

A compact orifice and an orifice clogging preventing mechanism respectively integrated with a hydraulic control unit in the orifice of a fluid passage of the hydraulic control unit formed by inserting plate between two parts and the orifice clogging preventing mechanism. One groove type fluid passage formed in the first part is in communicate with a groove type fluid passage formed in the second part via a group of small holes formed in a plate. The groove type fluid passage in the second part is in communicate with a separate groove type fluid passage in the first part from the groove type fluid passage in the first part via an orifice formed on the plate and the diameter of each small hole in the group of small holes is set to a smaller value than that of the orifice.

12 Claims, 17 Drawing Sheets

ORIFICE OF FLUID PASSAGE AND ORIFICE CLOGGING PREVENTING MECHANISM

CROSS-REFERENCE TO RELATED APPLICATIONS

The present application claims priority under 35 USC 119 to Japanese Patent Application Ser. No. 2001-314826 filed on Oct. 12, 2001 the entire contents thereof is hereby incorporated by reference.

BACKGROUND OF THE INVENTION

1. Field of the Invention

The present invention relates to an orifice of a fluid passage and an orifice clogging preventing mechanism applied to a hydraulic control unit of an internal combustion engine provided with a hydraulic type automatic transmission and other such devices.

2. Description of Background Art

Heretofore, an orifice and an orifice clogging preventing mechanism were provided, respectively, as separate mechanisms from a hydraulic control unit.

SUMMARY AND OBJECTS OF THE INVENTION

An object of the present invention is to provide a compact orifice and an orifice clogging preventing mechanism, respectively, that are integrated with a hydraulic control unit in the hydraulic control unit of an internal combustion engine provided with a hydraulic type automatic transmission.

The present invention provides an orifice of a fluid passage of a hydraulic control unit formed by inserting a plate between two parts and an orifice clogging preventing mechanism and includes one groove type fluid passage formed in the first part that is in communication with a groove type fluid passage formed in the second part via a group of small holes formed on the plate. The groove type fluid passage in the second part is in communication with a separate groove type fluid passage in the first part from the groove type fluid passage in the first part via an orifice formed on the plate and the diameter of each small hole in the group of small holes is set to a smaller value than that of the orifice.

As the invention is configured as described above, an orifice having a very compact structure and an orifice clogging preventing mechanism, respectively, can be installed that are integrated with the hydraulic control unit and as foreign matter which may cause a clogging of the orifice is picked by any one of the small holes in the group of small holes and does not reach the orifice even if the foreign matter is mixed in a fluid. Thus, the clogging of the orifice is prevented.

The present invention is directed to a hydraulic control unit which is a valve body of a hydraulic control unit of an internal combustion engine provided with a hydraulic type automatic transmission. Two parts are arranged to be adjacent to two layer components of layer components forming the valve body. Thus, a compact valve body for the hydraulic control unit can be provided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
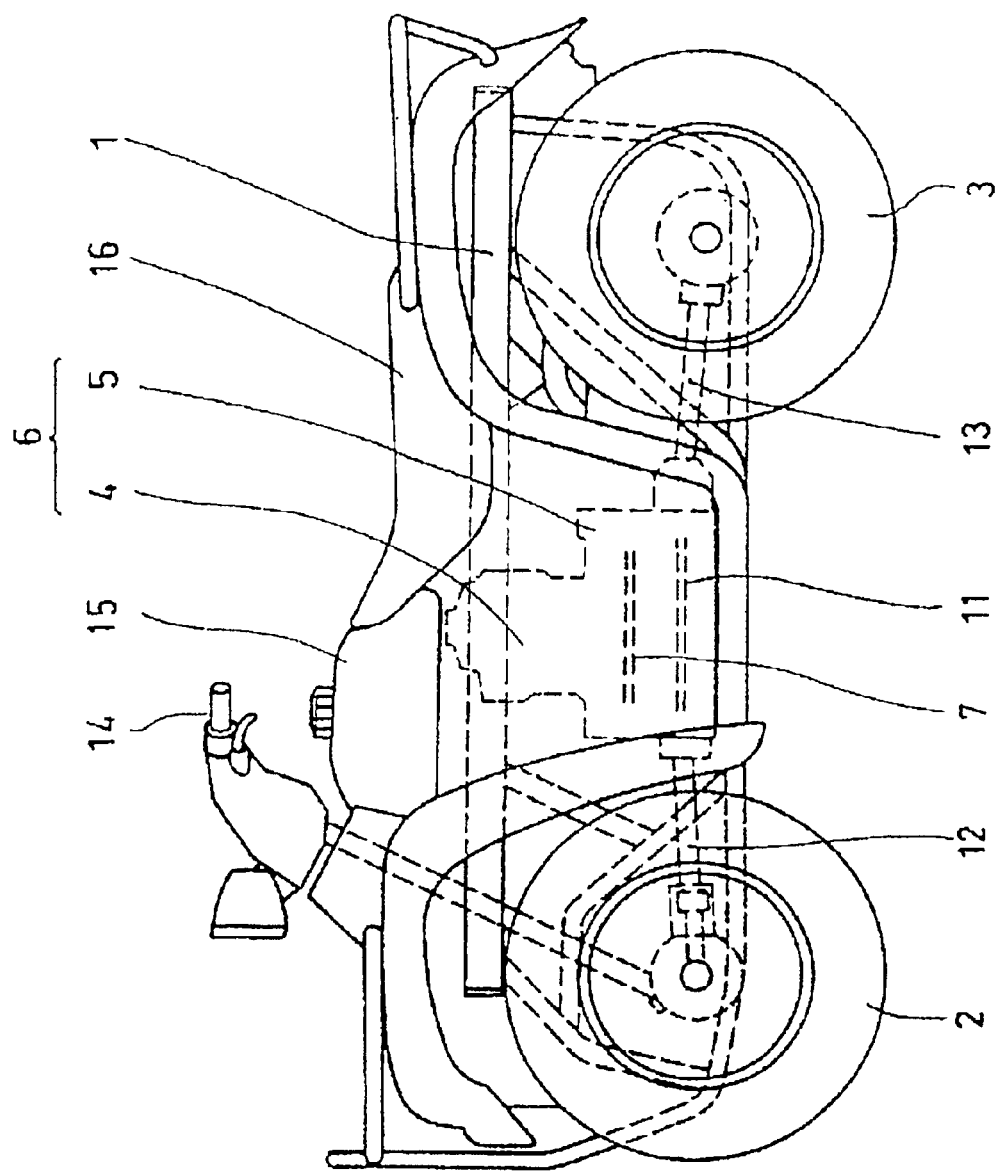
FIG. 1 is a side view showing a four-wheel buggy (a saddle-type vehicle for running on wasteland) in which an internal combustion engine according to the invention is mounted.
Figure 4:
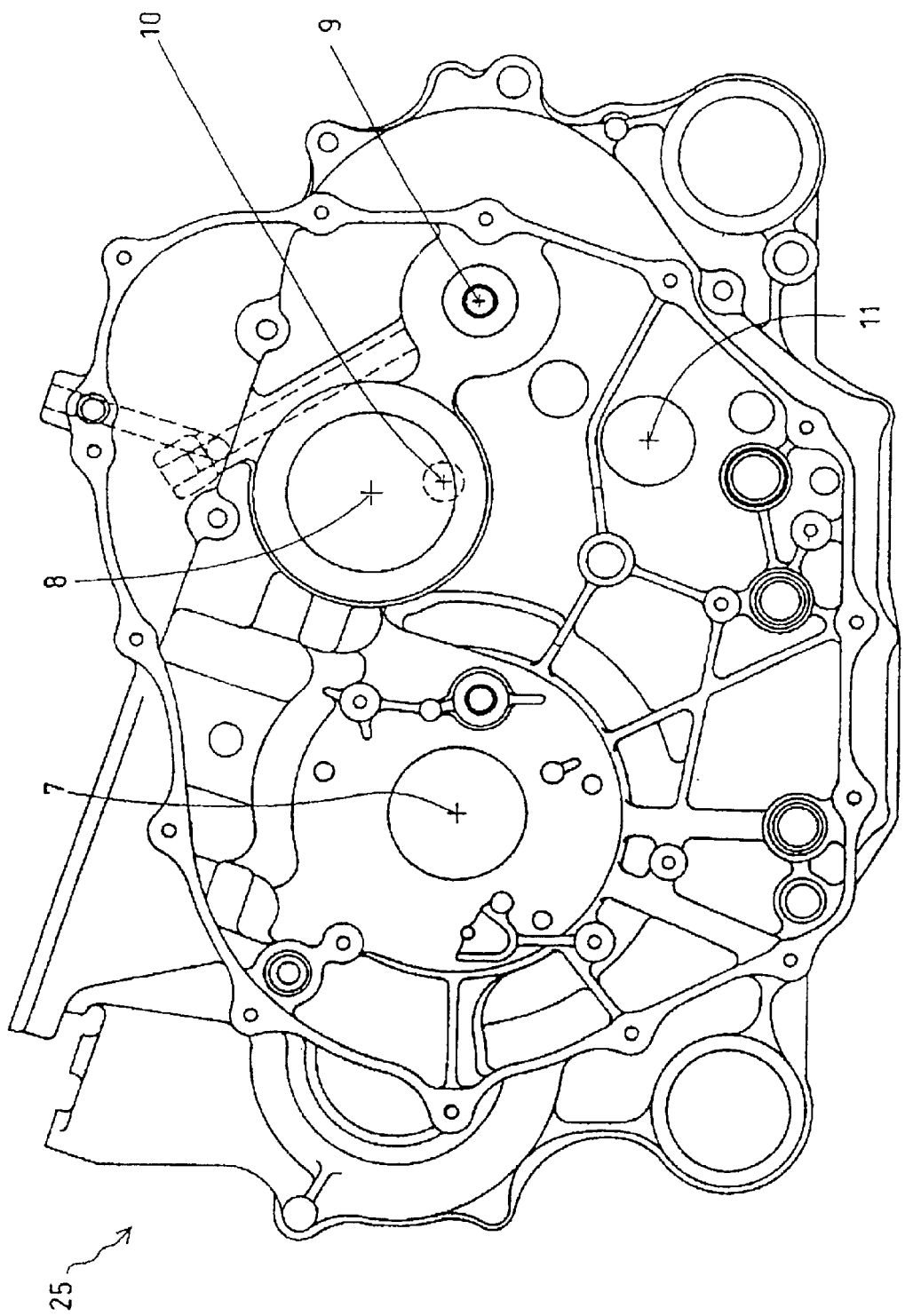
FIG. 4 illustrates a front crankcase viewed from the front.

FIG. 1 is a side view showing a four-wheel buggy (a saddle-type vehicle for operating on wasteland) wherein an internal combustion engine is provided with a hydraulic automatic transmission. The buggy is provided with a pair of right and left front wheels 2 and a pair of right and left rear wheels 3 in the front and in the rear of a body frame 1. A power unit 6 in which an internal combustion engine 4 and a transmission 5 are integrated are supported in the center of the body frame 1. The power unit 6 is arranged with a crankshaft 7 directed in a longitudinal direction of the body. The rotation of the crankshaft 7 is transmitted to an output shaft 11 via the main shaft 8 of the transmission, a counter shaft 9 and an intermediate shaft 10, respectively, as shown in FIG. 4. These shafts are parallel to the crankshaft and are arranged in the longitudinal direction of the body. The front wheel 2 is driven by a front wheel driving shaft 12 connected to the front end of the output shaft 11 and the rear wheel 3 is driven by a rear wheel driving shaft 13 connected to the rear end of the output shaft 11. On the upside of the body, a steering handlebar 14, a fuel tank 15 and a saddle-type seat 16 are equipped in this order from the front.

Figure 2:
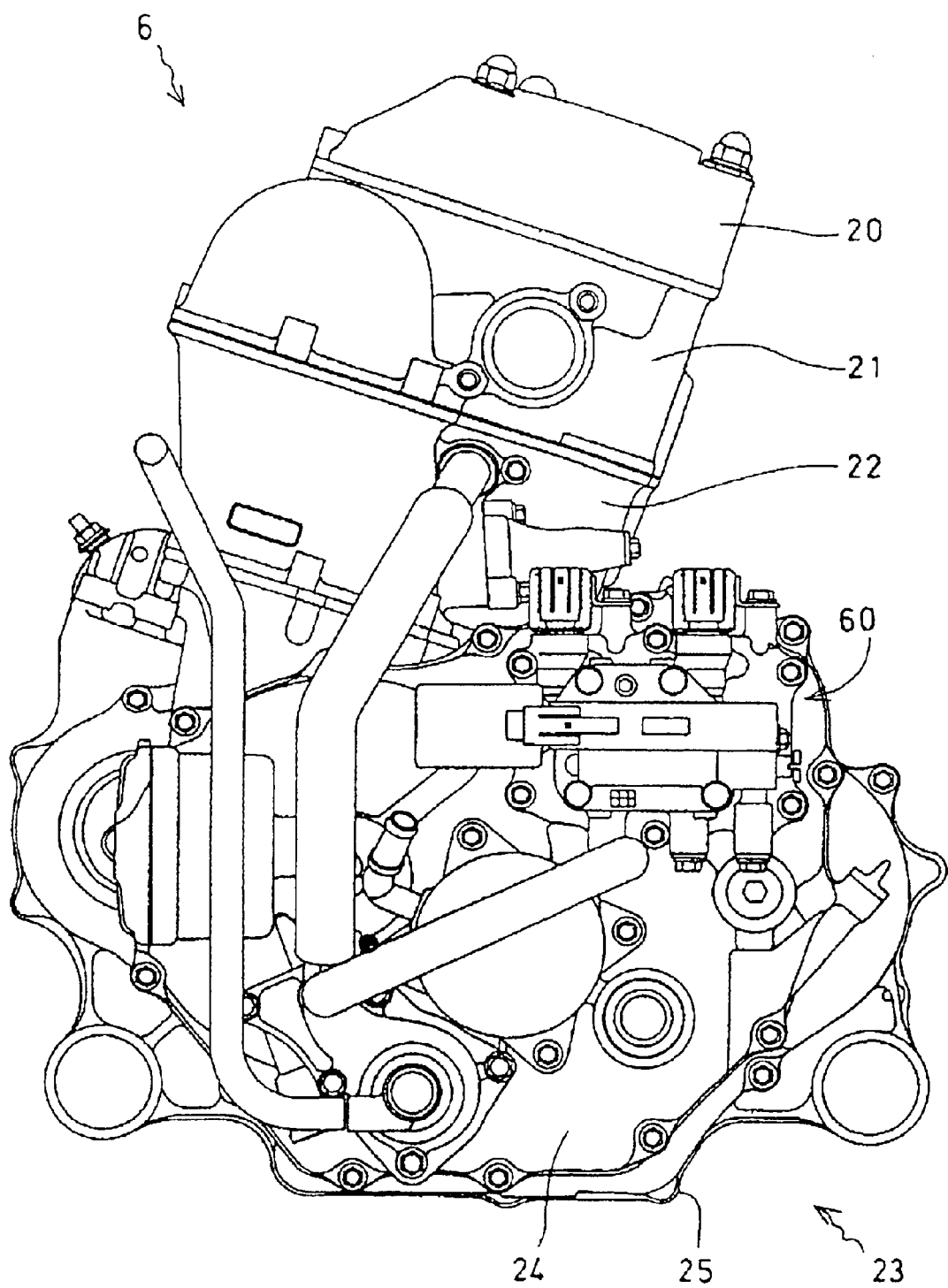
FIG. 2 is a front view showing a power unit according to the present invention.
Figure 3:
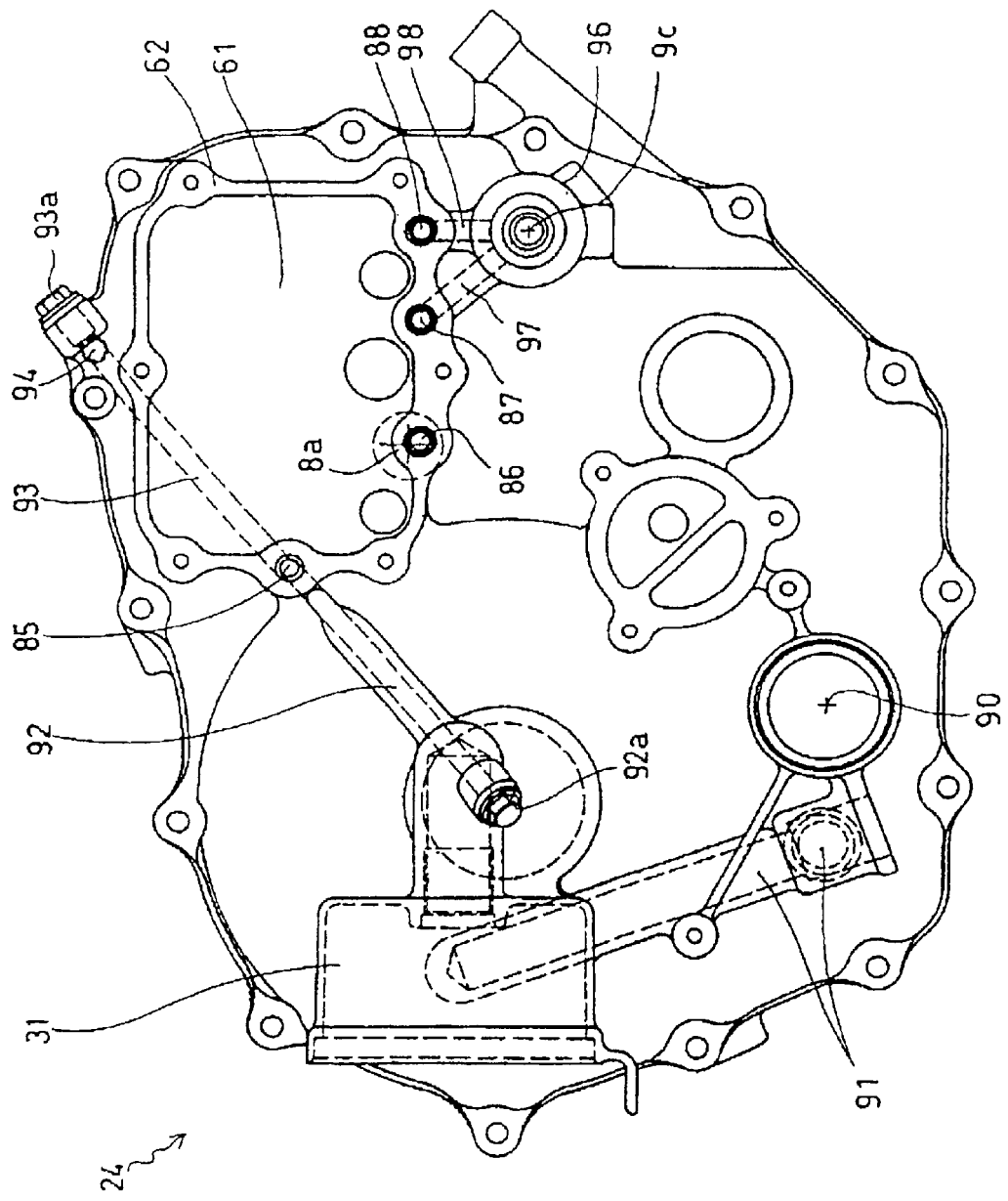
FIG. 3 illustrates a front crankcase cover viewed from the front.

FIG. 2 is a front view showing the front of the power unit 6. The body of the power unit 6 is roughly composed of four parts of a cylinder head cover 20, a cylinder head 21, a cylinder block 22 and a crankcase 23 in that order from the head. The crankcase 23 is divided into four parts on a face perpendicular to the crankshaft 7 and includes a front crankcase cover 24, a front crankcase 25, a rear crankcase 26 and a rear crankcase cover 27 in that order from the front (these are partially shown in FIGS. 5 and 6). In FIG. 2, the front crankcase cover 24 is illustrated and the front crankcase 25 is slightly shown in the periphery. Various equipment and piping are mounted on the front of the front crankcase cover 24. A valve body 60 of a hydraulic control unit is provided with an orifice of a fluid passage and an orifice clogging preventing mechanism according to the present invention. FIG. 3 illustrates the front crankcase cover 24 viewed from the front in a state in which the various equipment is not mounted and FIG. 4 shows the front crankcase 25 viewed from the front.

Figure 5:
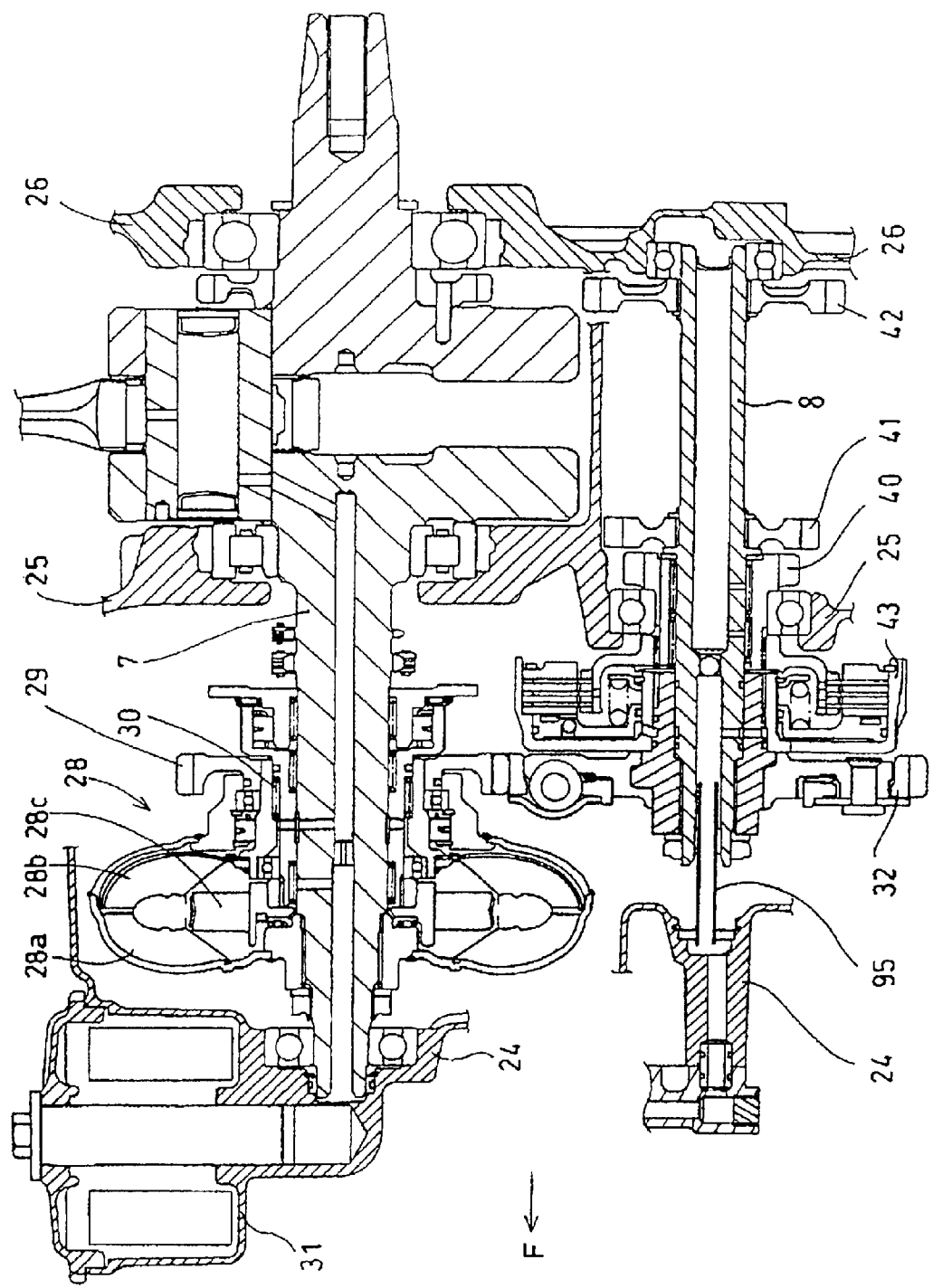
FIG. 5 is a longitudinal section of the inside of a crankcase showing the relationship between a crankshaft and a main shaft.
Figure 6:
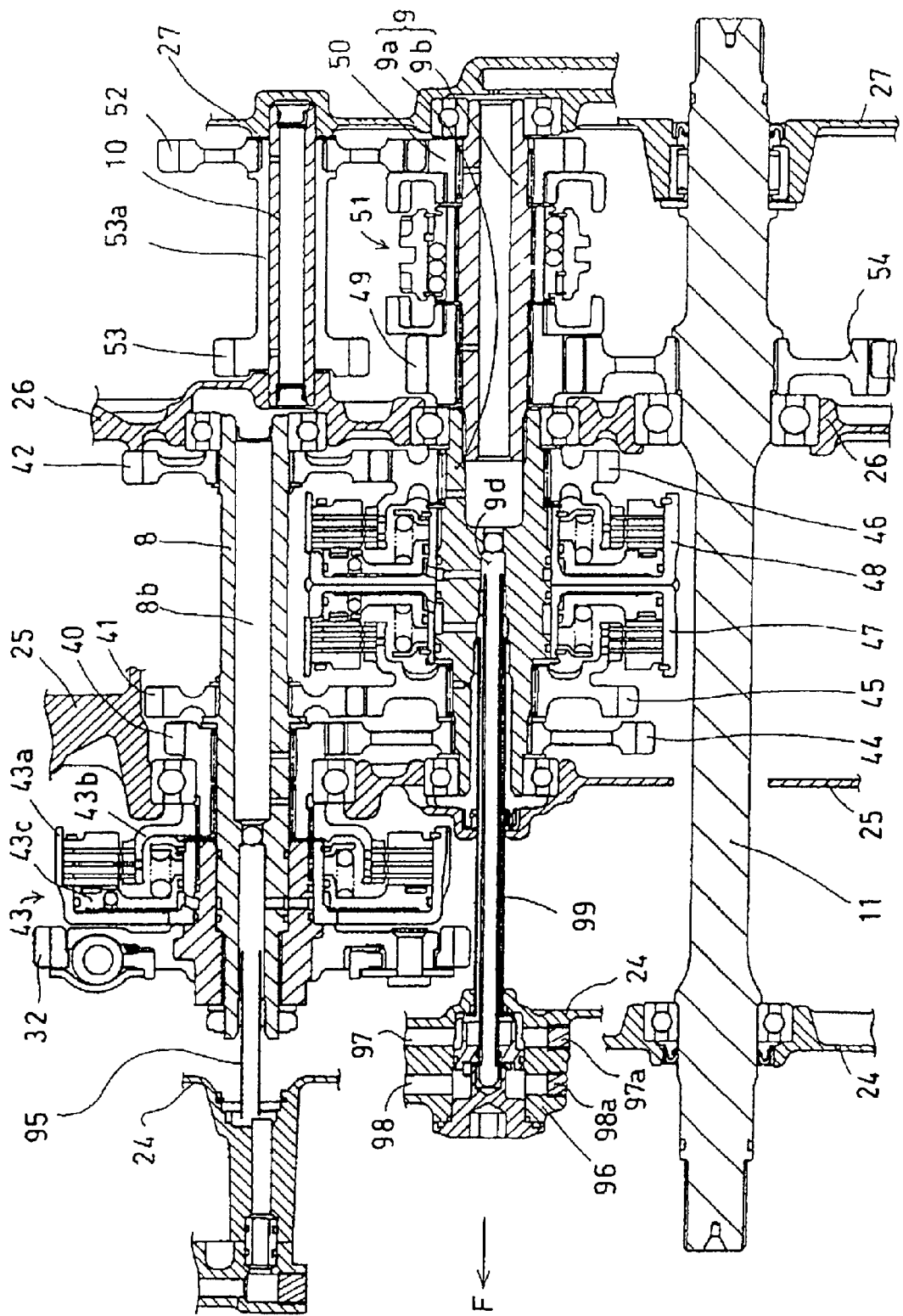
FIG. 6 is a longitudinal section of the inside of the crankcase showing the relationship between the main shaft, a counter shaft, an intermediate shaft and an output shaft.
Figure 7:
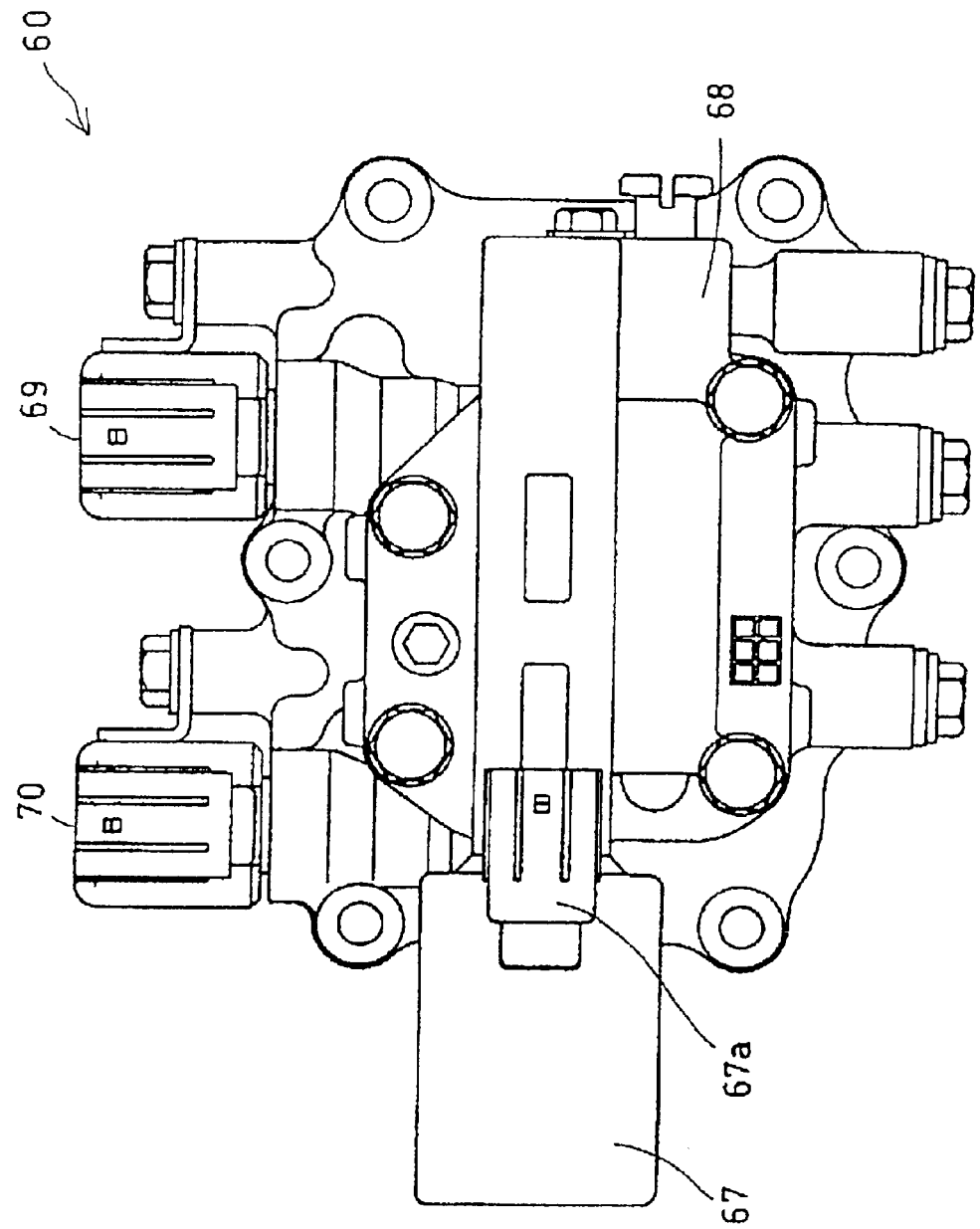
FIG. 7 is a front view showing a valve body.

In FIG. 4, each position of the crankshaft 7, the main shaft 8 of the transmission, the counter shaft 9, the intermediate shaft 10 and the output shaft 11 is shown. FIGS. 5 and 6 are longitudinal sections showing the inside of the crankcase including primary shafts in the crankcase, FIG. 5 shows the relationship between the crankshaft 7 and the main shaft 8 and FIG. 6 shows the relationship between the main shaft 8, the counter shaft 9, the intermediate shaft 10 and the output shaft 11. In FIG. 5, an arrow F indicates the front.

FIG. 5 shows a power transmission mechanism between the crankshaft 7 and the main shaft 8. The crankshaft 7 is supported by the front and rear crankcases 25 and 26 via a bearing. A front extended part of the crankshaft 7 is supported by the front crankcase cover 24 via a bearing. A driving gear 29 is provided on the crankshaft 7 via a torque converter 28. The driving gear 29 is held by the crankshaft 7 via a needle bearing 30 so that the driving gear can revolve. The torque converter 28 is provided with a pump impeller 28a fixed to the crankshaft 7, a turbine runner 28b opposite to the pump impeller and a stator 28c. The driving gear 29 is revolvable around the crankshaft 7 and is connected to the turbine runner 28b. When the torque converter 28 is connected, power from the crankshaft 7 can be transmitted. An oil filter 31 is provided on the front crankcase cover 24 that supports the front end of the crankshaft 7. A driven gear 32 is always engaged with the driving gear 29 and is fixed to the front end of the main shaft 8 of the transmission. When the torque converter 28 is connected, the revolution of the crankshaft 7 is transmitted to the main shaft 8 via the driving gear 29 and the driven gear 32.

FIG. 6 shows the power transmission mechanism between the main shaft 8 of the transmission, the counter shaft 9, the intermediate shaft 10 and the output shaft 11. The main shaft 8 of the transmission is supported by the front and rear crankcases 25 and 26 via a bearing. A first-speed driving gear 40, a second-speed driving gear 41 and a third-speed driving gear 42, respectively, are provided on the main shaft 8 that are different in the number of gear teeth according to a gear ratio. The second-speed driving gear 41 and the third-speed driving gear 42 are fixed gears fixed to the main shaft 8. However, the first-speed driving gear 40 is supported by the main shaft 8 via a needle bearing so that the first-speed driving gear can be rotated. In the following description, a idle gear is described which is a gear held by a needle bearing so that the gear can be rotated around a rotation axis. A hydraulic multiple disc clutch for first speed 43 is provided between the main shaft 8 and the first-speed driving gear 40. For this clutch, a clutch outer 43a is fixed to the main shaft and a clutch inner 43b is connected to the first-speed driving gear 40 which is the idle gear. When hydraulic fluid is supplied between the clutch outer 43a and a pressure plate 43c respectively of this clutch and is pressurized, the pressure plate 43c is moved and connects the clutch, the first-speed driving gear 40 is fixed to the main shaft 8.

The counter shaft 9 is an integrated counter shaft acquired by connecting a front 9a and a rear 9b. The counter shaft 9 is supported by the front crankcase 25, the rear crankcase 26 and the rear crankcase cover 27 via a bearing. A first-speed driven gear 44, a second-speed driven gear 45 and a third-speed driven gear 46, respectively, are always engaged with the first-speed driving gear 40, the second-speed driving gear 41 and the third-speed driving gear 42, respectively, of the main shaft 8 are provided on the front 9a of the counter shaft 9. The first-speed driven gear 44 is a fixed gear fixed to the counter shaft. However, the second-speed driven gear 45 and the third-speed driven gear 46 are idle gears. A hydraulic multiple disc clutch for a second speed 47 and a hydraulic multiple disc clutch for a third speed 48 are provided between the counter shaft 9 and either of these idle gears. The respective clutch outers of these clutches are fixed to the counter shaft 9 and the respective clutch inners are connected to the idle gears. When hydraulic fluid is supplied between the clutch outer and a pressure plate, respectively, of this clutch and is pressurized, the pressure plate is moved and connects the clutch. The idle gears are fixed to the counter shaft 9 and power transmission at second or third speed is enabled.

A driving gear for normal rotation 49 and a driving gear for reverse rotation 50 are provided to the rear 9b of the counter shaft 9. These are both idle gears. The gear with a manual dog clutch 51 provided in a medium is engaged and is fixed to the rear counter shaft.

An intermediate shaft 10 is supported by the rear crankcase 26 and the rear crankcase cover 27. A first intermediate gear 52 is always engaged with the driving gear for reverse rotation 50 and a second intermediate gear 53 is connected to the first intermediate gear 52 via a long sleeve 53a are held by the intermediate shaft 10 so that they can be turned.

The output shaft 11 is supported via a bearing by the front crankcase cover 24, the rear crankcase 26 and the rear crankcase cover 27. The output shaft 11 pierces the front crankcase 25 without being touched to the front crankcase 25. A driven gear 54 is always engaged with the driving gear for normal rotation 49 and the second intermediate gear 53 is fixed to the output shaft 11. The driven gear 54 is normally rotated or reversely rotated via the gear with which the dog clutch 51 is engaged and rotates the output shaft 11 in a direction suitable for the forward or backward travel of the vehicle. Reverse rotation is controlled so that it occurs only when the counter shaft is rotated at the first speed.

The gears in the transmission are all constant-mesh gears. Depending upon which clutch of the hydraulic multiple disc clutches 43, 47, 48 is to be connected it is determined that any transmission gear ratio is executed. It is a valve body 60 built by a cut-off poppet valve and a solenoid for driving it as an integrated hydraulic control unit that controls oil pressure. The valve body is attached to the front of the front crankcase cover 24 as shown in FIG. 2. The valve body 60 is mounted on a mounting concave portion 61 of the front crankcase cover 24 as shown in FIG. 3 and is fixed on a mounting face 62 on the periphery of the mounting concave portion via a gasket. In a state in which the valve body is mounted, a front half of the valve body 60 is exposed to the outside of the front crankcase cover 24 and a rear half is buried in the mounting concave portion 61 of the front crankcase cover 24. The mounting face 62 is formed in parallel with a divided face of the crankcase.

Figure 8:
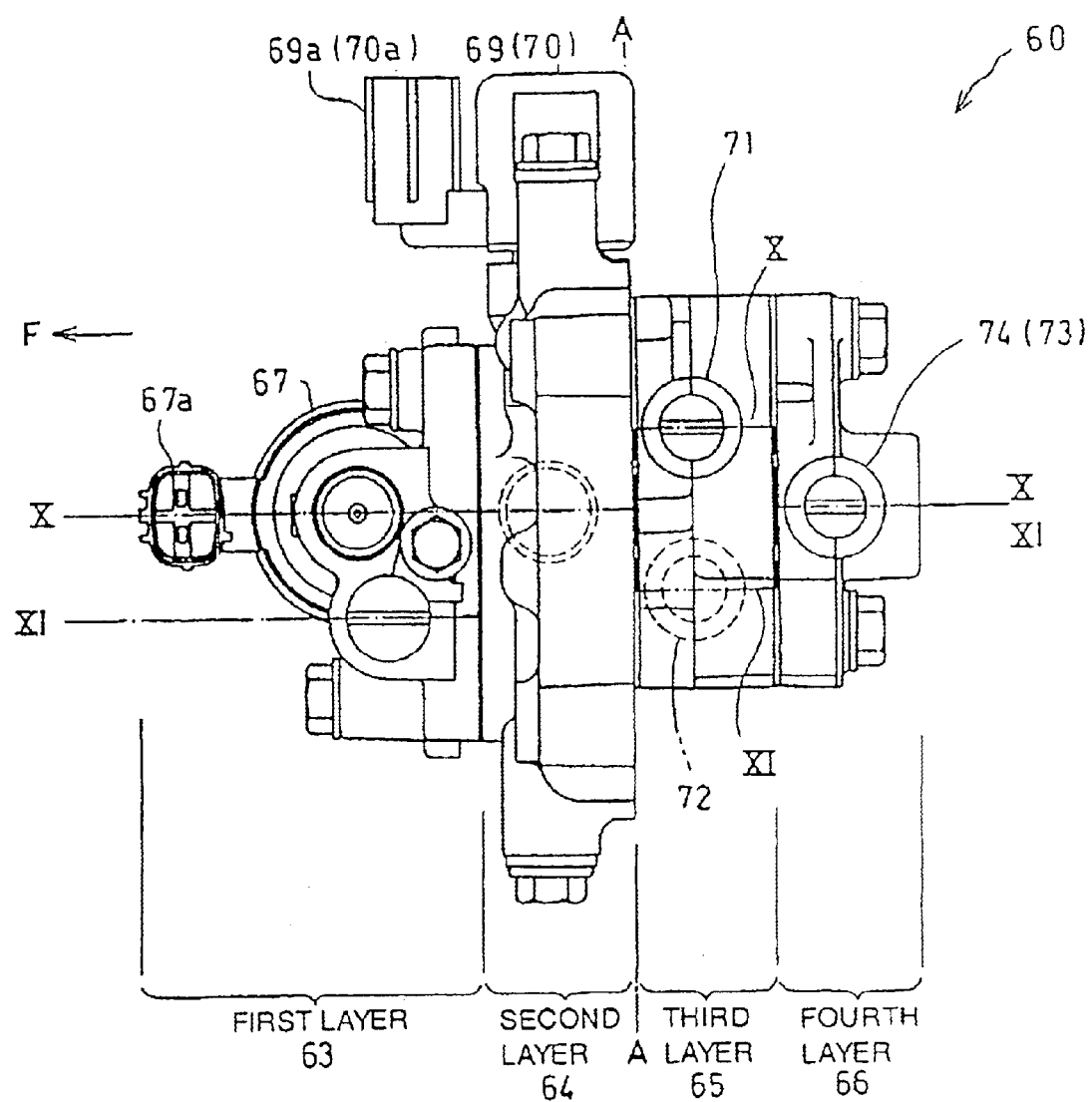
FIG. 8 is a side view showing the valve body viewed from the right side.
Figure 10:
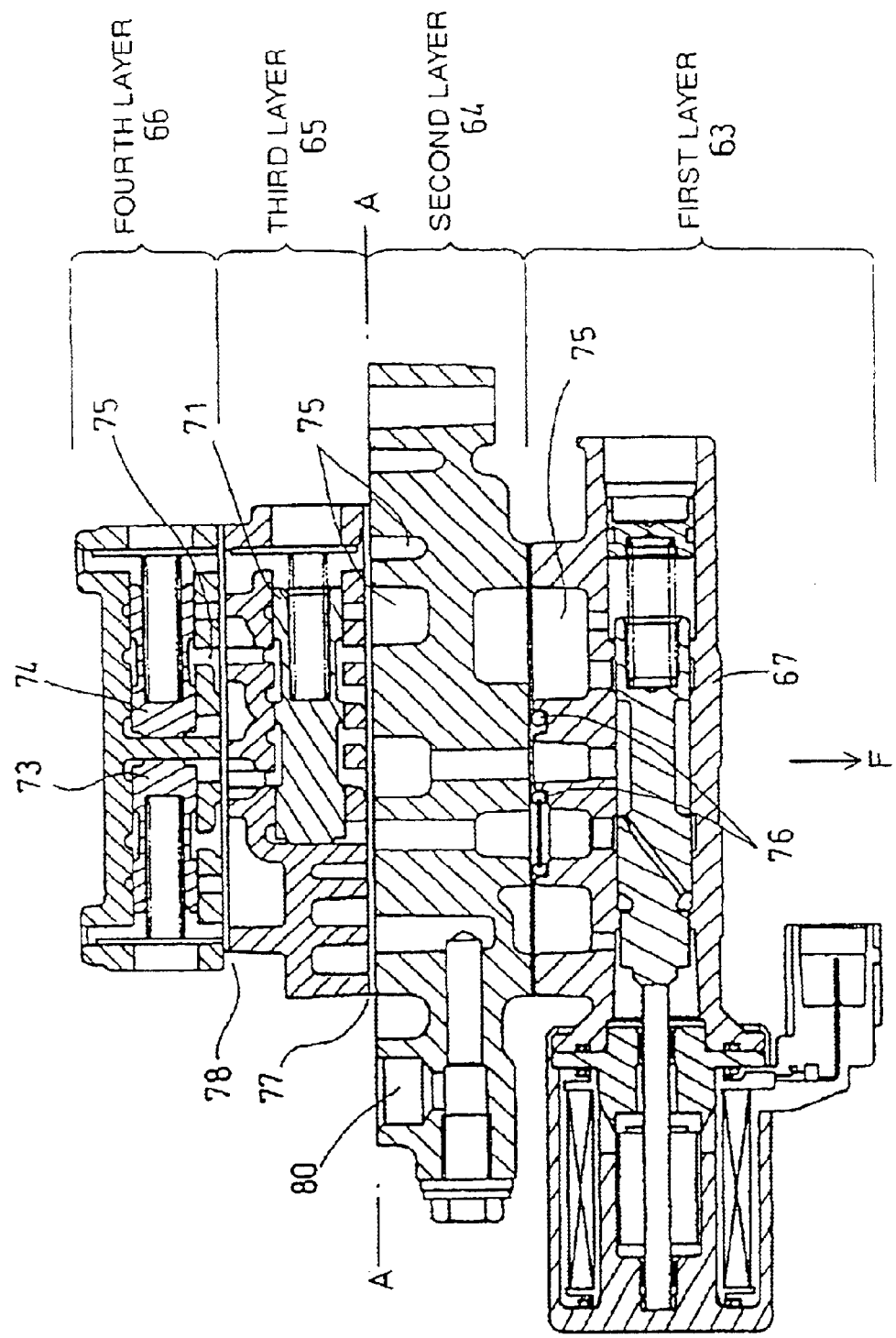
FIG. 10 is a sectional view viewed along a line X—X in FIG. 8.
Figure 11:
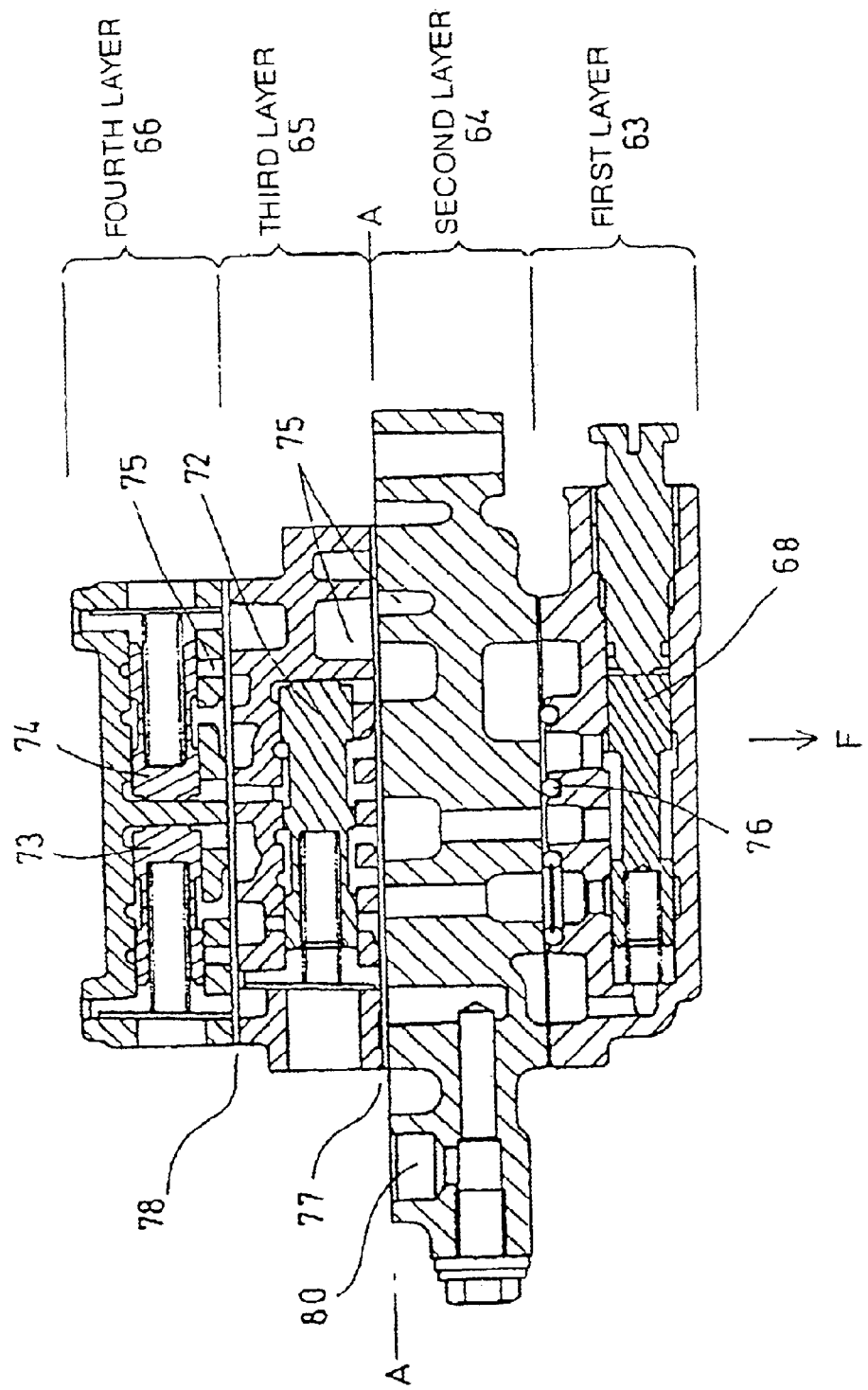
FIG. 11 is a sectional view viewed along a line XI—XI in FIG. 8.

As shown in FIGS. 8, 10 and 11, an arrow F indicates the front. This unit is composed of four layers as a whole, is detailedly composed of a first layer 63, a second layer 64, a third layer 65 and a fourth layer 66 in this order from the front. The rear face of the second layer, that is, a face shown by a line A—A in FIGS. 8, 10 and 11 is in contact with the mounting face 62 of the front crankcase cover and is fixed by a bolt via the gasket. The third layer 65 and the fourth layer 66 of the valve body 60 are housed in the mounting concave portion 61 of the front crankcase cover.

A linear solenoid valve 67 and an emergency valve 68 are provided on the first layer 63 of the valve body 60. An electric wire connecting terminal 67 is provided on the solenoid. A solenoid valve for switching first speed and second speed 69 and a solenoid valve for switching second speed and third speed 70 are provided on the second layer 64. Electric wire connecting terminals 69a and 70a are provided on each solenoid. A spool valve for switching first speed and second speed 71 and a spool valve for switching second speed and third speed 72, the respective spools of which are driven by oil pressure according to the on-off action of each solenoid valve, are provided on the third layer 65. The spool valves are valves for controlling the supply of hydraulic fluid to the hydraulic multiple disc clutches 43, 47 and 48. Hydraulic control valves 73 and 74 are provided on the fourth layer 66. The control valves are valves for controlling the discharge of hydraulic fluid from the hydraulic multiple disc clutches 43, 47 and 48.

Figure 12:
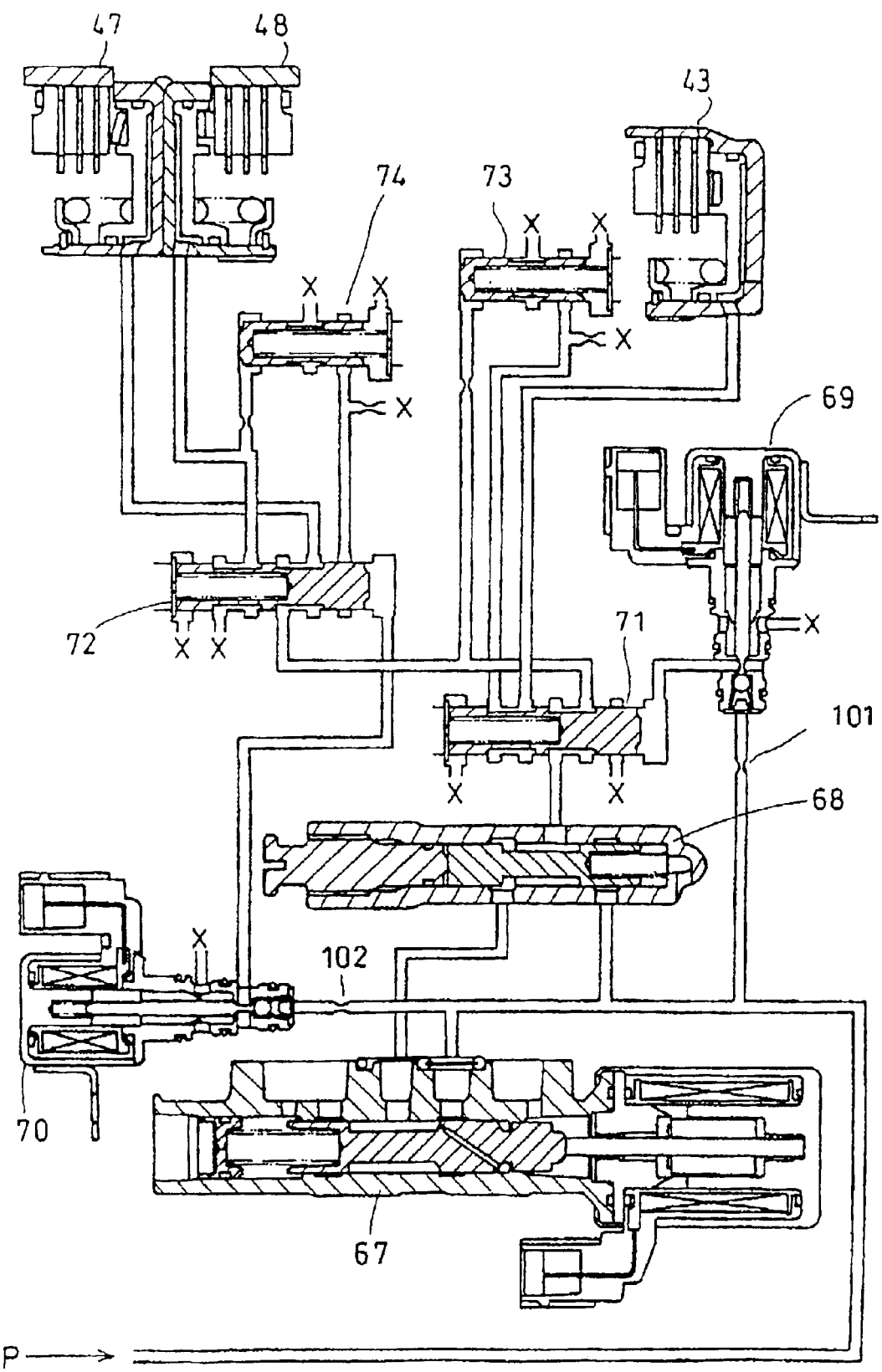
FIG. 12 is a schematic diagram showing a hydraulic system for control equipment of a transmission housed in the valve body.

FIG. 12 is a schematic diagram of hydraulic fluid for connecting the equipment. As shown in FIG. 12, all of the equipment is built in the valve body 60 except the hydraulic multiple disc clutches 43, 47 and 48. A part of the fluid fed under pressure through a filter from an oil pump (not shown) is provided in the crankcase 23 and is driven by the internal combustion engine 4 and is supplied to the system from a direction shown by an arrow P in a lower part of FIG. 12 as hydraulic fluid for operating the hydraulic multiple disc clutch. A discharge port shown by X in FIG. 12 is a discharge port for fluid and used hydraulic fluid discharged from the discharge port is collected in an oil tank not shown. The other part of the fluid through the filter is fed to each part as hydraulic fluid for the torque converter or lubricating oil for the transmission and a valve cam though its path is not shown in the schematic diagram.

As shown in FIG. 12, hydraulic fluid is supplied to the clutch further via each spool valve for switching through the linear solenoid valve 67. The linear solenoid valve 67 is a valve for slacking the rise of oil pressure when the supply of hydraulic fluid is initiated. The hydraulic fluid through the linear solenoid valve 67 is fed to the spool valve for switching via the emergency valve 68. The emergency valve 68 normally fulfills only a role of providing a passage of hydraulic fluid, however, when the linear solenoid valve 67 fails, the emergency valve provides a new path for making hydraulic fluid flow without passing the linear solenoid valve 67 and is manually operated when the linear solenoid valve fails.

The solenoid valve for switching first speed and second speed 69 and the solenoid valve for switching second speed and third speed 70 have the on-off control of oil pressure for driving each spool of the spool valve for switching first speed and second speed 71 and the spool valve for switching second speed and third speed 72, and the supply destination of hydraulic fluid of each spool valve 71, 72 is determined depending upon the position of the spool. When hydraulic fluid is supplied to any of the hydraulic multiple disc clutches 43, 47 and 48, the clutch is connected, the idle gear connected to the clutch is fixed to the shaft and a shift is made according to the transmission gear ratio defined for the gear. At this time, hydraulic fluid is required to be discharged from the connected hydraulic multiple disc clutch before the shift. Discharged fluid is discharged via a hydraulic control valve 73 or 74 the oil pressure is controlled and inside the hydraulic control valves 73 and 74 a suitable fluid passage is formed.

As shown in FIGS. 10 and 11, on an opposite face of each layer of the valve body 60 to the adjacent layer, multiple fluid passages 75 in the hydraulic system shown in FIG. 12 are formed. In a part wherein fluid passages on the surface and the rear surface are required to be connected in each layer, a fluid passage perpendicular to the opposite face is provided with the fluid passage piercing the inside of the layer. O-ring 76 is installed in a communicating part of the fluid passages of both layers on the opposite faces of the first and second layers so as to prevent fluid from leaking. Steel plates 77 and 78 are inserted between the opposite faces of the second layer and the third layer and the opposite faces of the third layer and the fourth layer. A fluid passage hole is provided in locations of this plate required to connect a groove type fluid passage provided on the surface of each layer.

Figure 13:
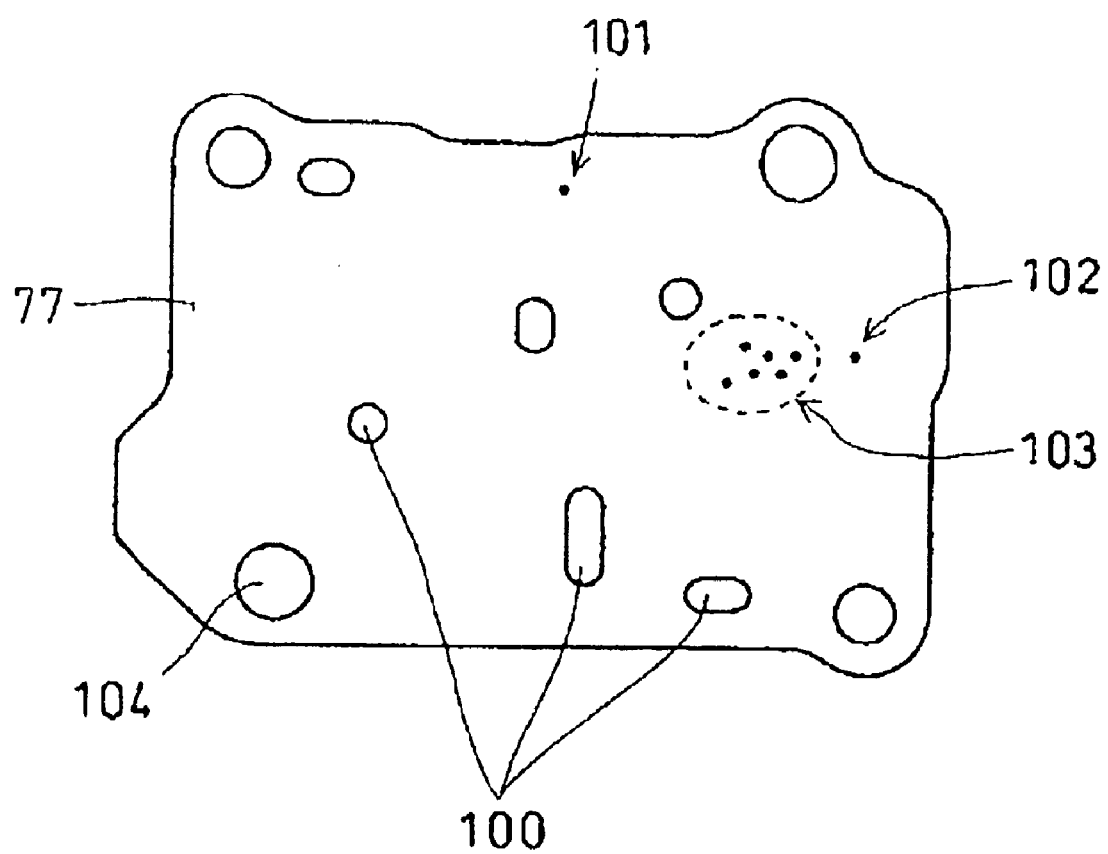
FIG. 13 is a plan showing a plate inserted between a second layer and a third layer and viewed from the rear.

FIG. 13 is a plan showing a steel plate 77 inserted between the second layer and the third layer and viewed from the rear. A circular or elliptic hole provided on the plate 77 is a fluid passage hole 100 provided in locations for connecting the groove type fluid passage on the third layer and the groove type fluid passage on the fourth layer. In addition, two holes having a smaller diameter than the diameter of the fluid passage hole 100 are provided on the plate 77. These are orifices 101 and 102 and are provided on a hydraulic path in which fluid flows to the solenoid valve for switching first speed and second speed 69 and the solenoid valve for switching second speed and third speed 70 as the positions are shown in the hydraulic system diagram shown in FIG. 12. A group of small holes 103, composed of small holes having a further smaller diameter than the diameter of the orifice, are provided on the plate 77. A hole provided on four corners of the plate 77 is a hole 104 into which a bolt for connecting each layer is inserted.

Figure 14:
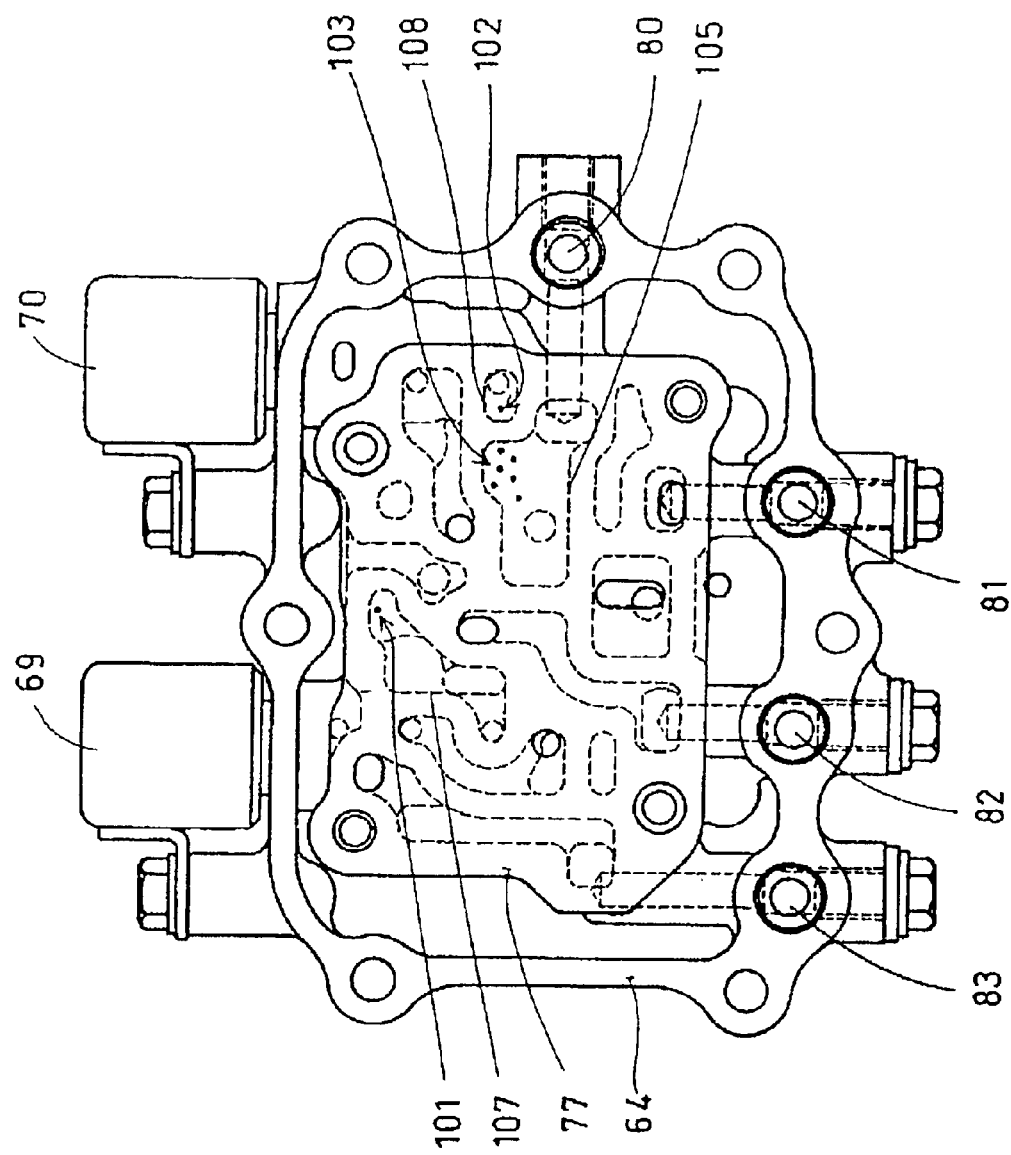
FIG. 14 illustrates a view from the rear in which the plate is attached to the rear of the second layer.

FIG. 14 is a view from the rear in which the plate 77 is attached to the rear of the body of the second layer 64. A part hidden under the plate 77 is shown by a broken line. Multiple groove type fluid passages are provided on the rear of the body of the second layer 64 wherein through fluid passages for communicating with groove type fluid passages provided on the surface on the reverse side (the front) are also included.

Figure 15:
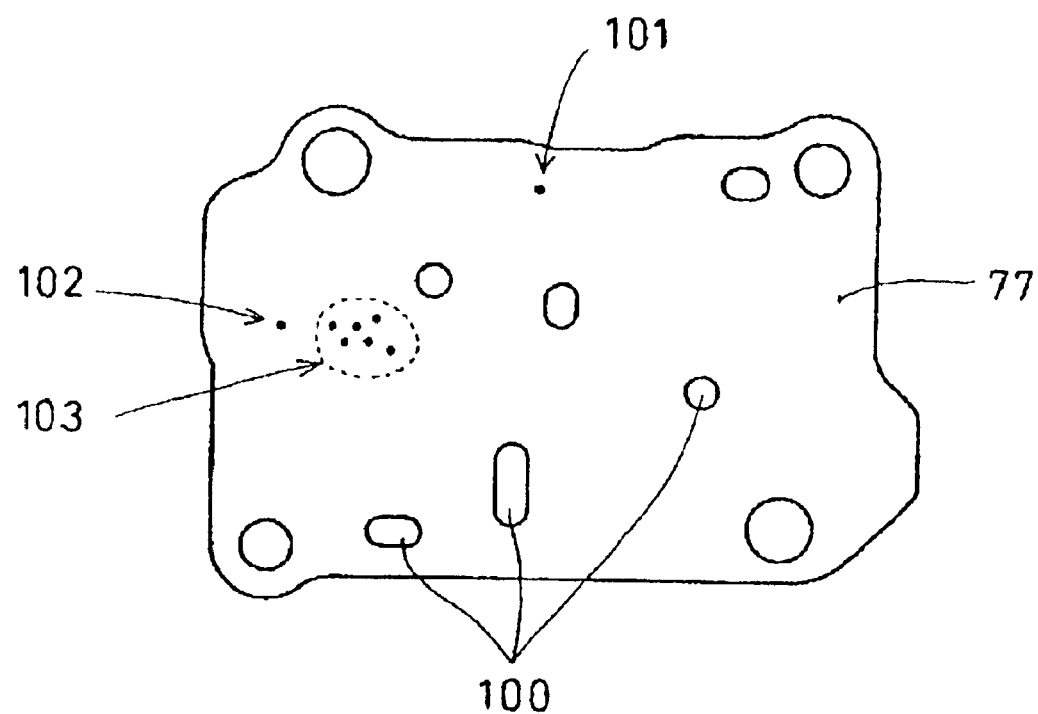
FIG. 15 is a plan view showing the plate inserted between the second layer and the third layer and viewed from the front.

FIG. 15 is a plan showing the steel plate 77 viewed from the front. FIG. 15 shows the surface on the reverse side of the plate 77 shown in FIG. 13. Therefore, FIG. 15 shows that the orifices 101 and 102 and the group of small holes 103 are located in symmetrical positions with the positions shown in FIG. 13.

Figure 16:
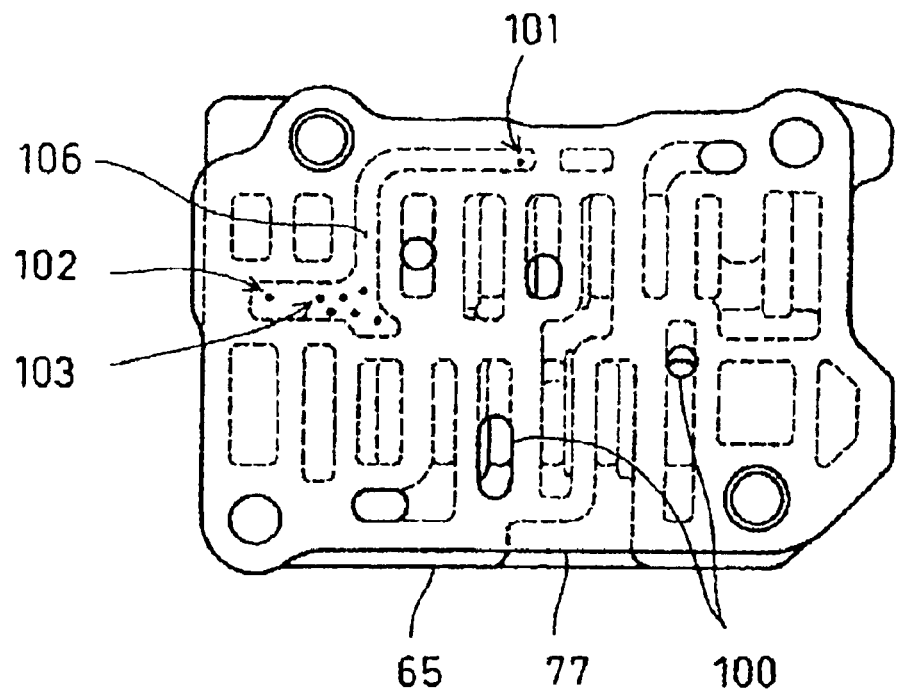
FIG. 16 illustrates a view from the front in which the plate is attached to the front of the third layer.

FIG. 16 is a view from the front in which the plate 77 is attached to the front of the body of the third layer 65. A part hidden under the plate 77 is shown by a broken line. Multiple groove type fluid passages are provided on the front of the body of the third layer 65 wherein through fluid passages for communicating with the groove type fluid passages provided to the surface on the reverse side (the rear) are also included.

The rear of the body of the second layer 64 shown in FIG. 14 and the front of the body of the third layer 65 shown in FIG. 16 are connected via the plate 77 shown in FIG. 13 (or FIG. 15). On the second layer shown in FIG. 14, a hydraulic fluid inlet 80 to the valve body, a hydraulic fluid outlet 81 towards the hydraulic multiple disc clutch for the first speed, a hydraulic fluid outlet 82 towards the hydraulic multiple disc clutch for the second speed and a hydraulic fluid outlet 83 towards the hydraulic multiple disc clutch for the third speed are provided.

As shown in FIG. 14, hydraulic fluid fed under pressure by an oil pump via the hydraulic fluid inlet 80 enters a groove type fluid passage 105 on the second layer 64 and flows into a groove type fluid passage 106 shown in FIG. 16 via the group of small holes 103 of the plate 77. The orifices 101 and 102 are provided on parts facing the groove type fluid passage 106 of the plate 77 and hydraulic fluid flows into groove type fluid passages 107 and 108 shown in FIG. 14 via these orifices. The groove type fluid passage 107 communicates with the solenoid valve for switching the first speed and second speed 69 and the groove type fluid passage 108 communicates with the solenoid valve for switching the second speed and third speed 70.

Figure 17:
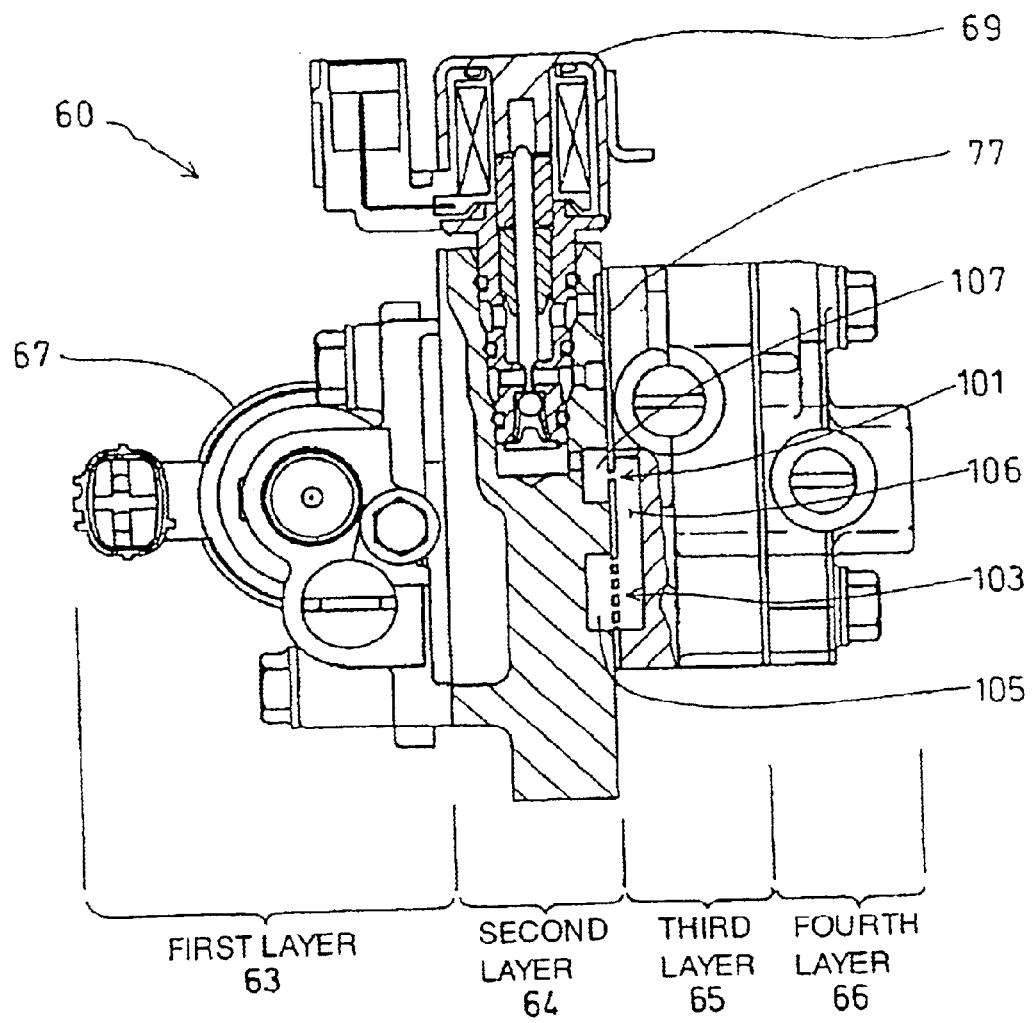
FIG. 17 is a side view showing the valve body viewed from the right.

FIG. 17 is a side view showing the valve body 60 viewed from the right and in a part, the cross section is shown. This cross section includes the solenoid valve for switching the first speed and second speed 69, the orifice 101 and the group of small holes 103. Hydraulic fluid flows into the solenoid valve for switching the first speed and second speed 69 via the groove type fluid passage 105, the group of small holes 103, the groove type fluid passage 106, the orifice 101 and the groove type fluid passage 107.

The orifices 101 and 102 are provided to relieve impact by pressurization of hydraulic fluid applied to the solenoid valves 69 and 70. Therefore, the diameter of the hole is set to a small value. In the valve body, a foreign matter such as metallic powder made while operating is sometimes left and when this is clogged in the orifice, the normal operation of a valve is disabled. The group of small holes 103 is provided to prevent the orifice from being clogged and therefore, the group is composed of a plurality of holes having a further smaller diameter than the diameter of the orifice.

Figure 9:
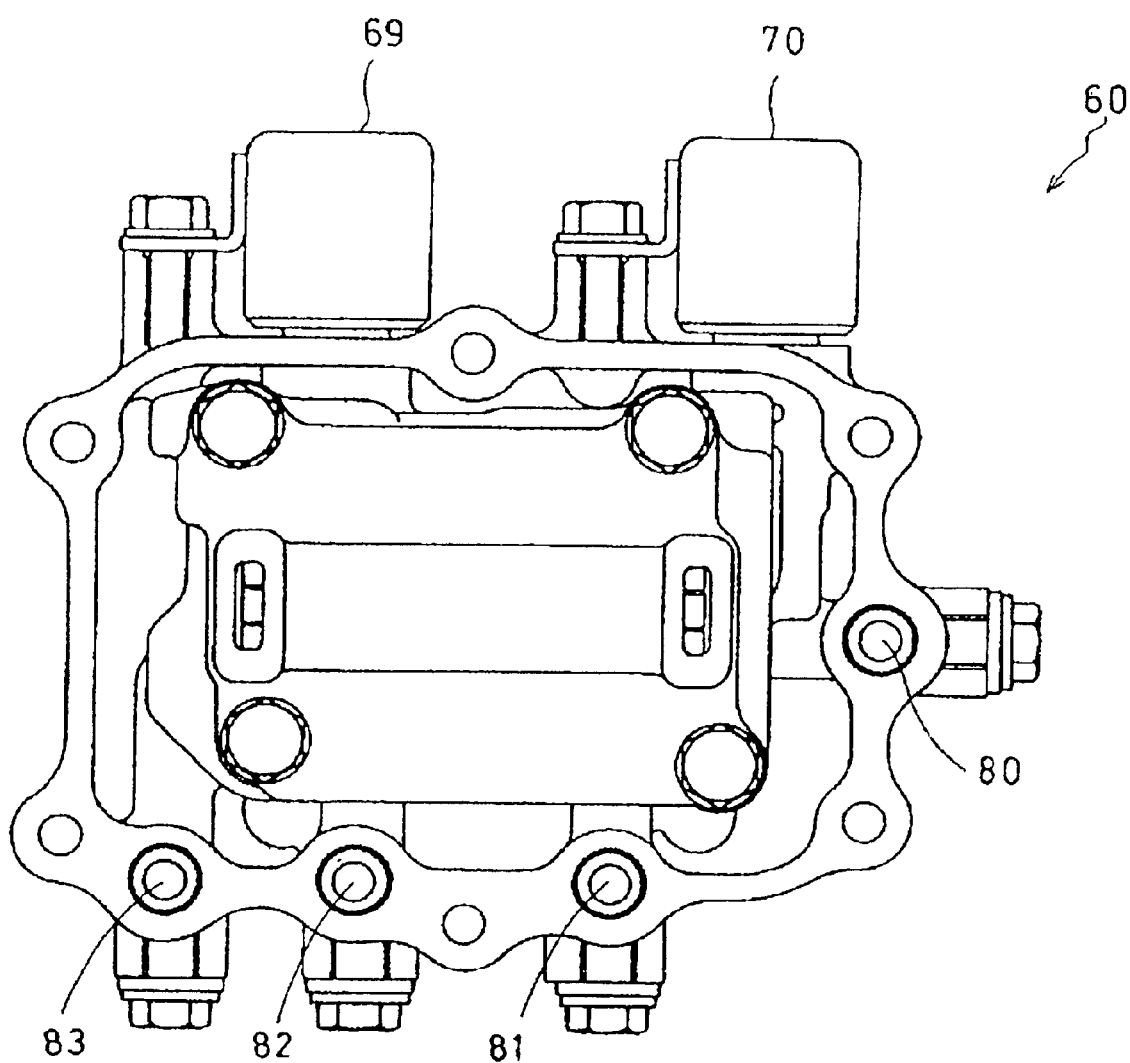
FIG. 9 is a rear view showing the valve body.

As shown in FIG. 9, an inlet 80 is provided for hydraulic fluid to the valve body 60. An outlet 81 is provided for hydraulic fluid to flow towards the hydraulic multiple disc clutch for first speed. An outlet 82 is provided for hydraulic fluid to flow towards the hydraulic multiple disc clutch for the second speed. An output 83 is provided for hydraulic fluid to flow towards the hydraulic multiple disc clutch for the third speed. The inlet 80 of hydraulic fluid is also shown in FIGS. 10 and 11.

Figure 18:
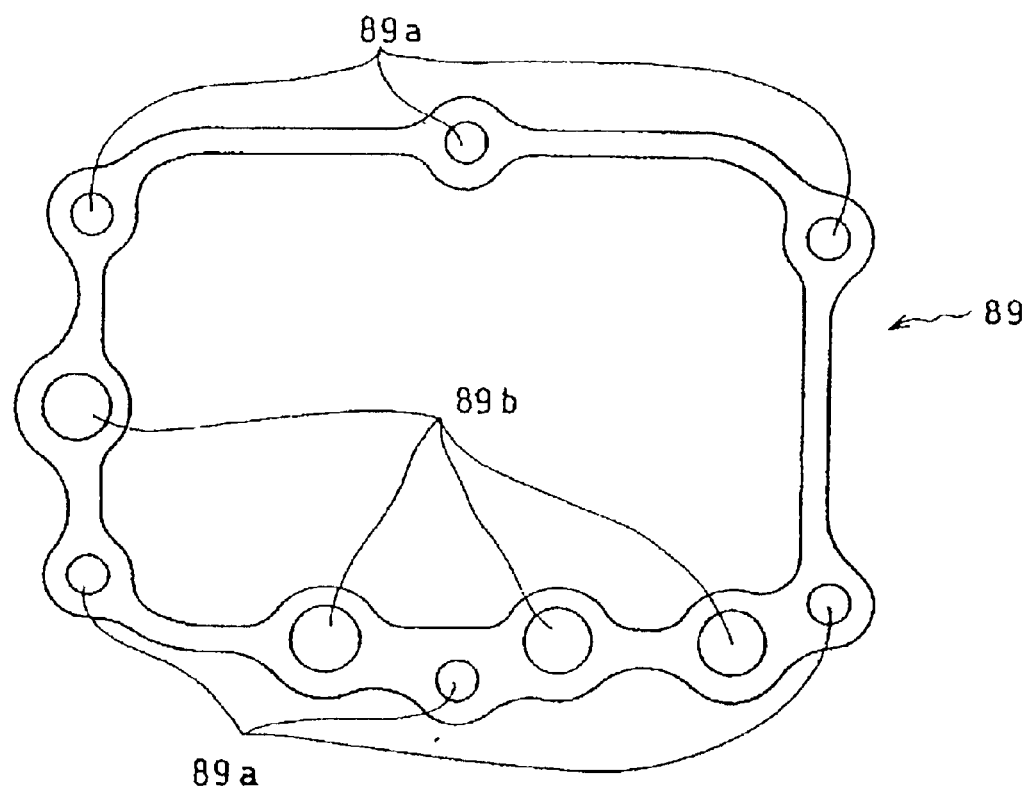
FIG. 18 is a plan view showing a gasket for mounting the valve body.

Openings on the side of the front crankcase cover 24 corresponding to the inlet 80 and the outlets 81, 82 and 83 of hydraulic fluid shown in FIG. 9 are equivalent to a supply port 85 of hydraulic fluid to the valve body 60 provided to the valve body mounting face 62 shown in FIG. 3, an inlet 86 of hydraulic fluid towards the hydraulic multiple disc clutch for the first speed, an inlet 87 of hydraulic fluid towards the hydraulic multiple disc clutch for the second speed and an inlet 88 of hydraulic fluid towards the hydraulic multiple disc clutch for the third speed. When the valve body 60 is mounted on the valve body mounting face 62, a gasket 89 shown in FIG. 18 is inserted. A small-diameter hole 89a provided on the gasket is a mounting bolt inserting hole and a large-diameter hole 89b is a hydraulic fluid passage hole.

As shown in FIG. 3, an extended position 90 of the center line of a pump shaft of an oil pump is provided. Note that the oil pump is not shown. The oil pump is provided between the front crankcase cover 24 and the front crankcase 25. Oil fed from the oil pump is fed to the oil filter 31 via an oil passage 91 from inside the wall of the front crankcase cover 24. After the oil filter filters out foreign matter from the oil, the oil is fed via an oil passage 92 and a part of the oil is fed to the valve body 60 from the hydraulic fluid supply port 85. The other part of the oil is fed to locations requiring lubrication via an oil passage 93. An oil passage 94 is perpendicular to the oil passage 93 and extends in a direction of the front crankcase 25.

As shown in FIG. 3, an extended position 8a of the center line of the main shaft 8 of the transmission is provided. Note that the transmission is not shown. Hydraulic fluid fed from the valve body 60 to the inlet 86 of hydraulic fluid towards the hydraulic multiple disc clutch for the first speed is fed from the rear face of the front crankcase cover 24 to the central hole 8b of the main shaft via a pipe for supplying hydraulic fluid 95 (shown in FIGS. 5 and 6) and is supplied to the hydraulic multiple disc clutch for the first speed 43.

As shown in FIG. 3, an extended position 9c of the center line of the counter shaft 9 is provided. A fluid passage connecting part 96 is provided in this part of the front crankcase cover 24 and fluid passages 97 and 98 are formed from the inlet 87 of hydraulic fluid towards the hydraulic multiple disc clutch for the second speed and the inlet 88 of hydraulic fluid towards the hydraulic multiple disc clutch for the third speed to the fluid passage connecting part 96. Hydraulic fluid fed from the valve body 60 to the inlet 87 or the inlet 88 of hydraulic fluid is supplied to the hydraulic multiple disc clutch for second speed 47 or the hydraulic multiple disc clutch for the third speed 48 via either an inner or outer passage of a double pipe 99 (shown in FIG. 6) for supplying hydraulic fluid supplied from the fluid passage connecting part 96 to the central hole 9d of the counter shaft 9.

Fluid passages provided on the front crankcase cover 24 are all bored from the outside face of the front crankcase cover 24, linear short fluid passages mutually communicate inside and form a long deflected fluid passage. An open end made in the manufacturing of the fluid passage towards the outside of the front crankcase cover is blocked by a blocking bolt. FIG. 3 illustrates blocking bolts 92a and 93a and FIG. 6 illustrates blocking bolts 97a and 98a As this embodiment is configured as described above, the orifices can be formed with a very compact structure and even if foreign matter, such as metallic powder made in working the valve body is mixed in fluid, which may cause the clogging of the orifice, the foreign matter is picked by any one of the small holes in the group of small holes. Since the foreign matter does not reach the orifice, the orifice is prevented from being clogged.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An orifice of a fluid passage of a hydraulic control unit formed by inserting a plate between two parts and an orifice clogging preventing mechanism comprising:
    a groove type fluid passage formed in a first part is in communication with a groove type fluid passage formed in a second part via a group of small holes formed in the plate;
    the groove type fluid passage in the second part is in communication with a separate groove type fluid passage in the first part from the groove type fluid passage in the first part via an orifice formed in the plate; and
    the diameter of each small bole in the group of small holes is set to a smaller value relative to the diameter of the orifice.

2. The orifice of a fluid passage and an orifice clogging preventing mechanism according to claim 1, wherein:
    the hydraulic control unit is a valve body of a hydraulic control unit of an internal combustion engine provided with a hydraulic type automatic transmission; and
    the two parts are adjacent two layer components of layer components forming the valve body.

3. The orifice of a fluid passage and an orifice clogging preventing mechanism according to claim 1, wherein foreign material in a hydraulic fluid supplied to the hydraulic control unit is retained by said group of small holes to prevent clogging of said orifice.

4. The orifice of a fluid passage and an orifice clogging preventing mechanism according to claim 1, wherein hydraulic fluid is supplied to the groove type fluid passage in the first part and flows through the group of small holes into the groove type fluid passage formed in the second part for filtering foreign particles from the hydraulic fluid.

5. The orifice of a fluid passage and an orifice clogging preventing mechanism according to claim 1, wherein the separate groove type fluid passage in the first part is in communication with a solenoid valve for switching a first speed and second speed of a transmission.

6. The orifice of a fluid passage and an orifice clogging preventing mechanism according to claim 1, and further including a second orifice in communication with a second separate groove type fluid passage and with a solenoid valve for switching a second speed and third speed of a transmission.

7. An orifice of a fluid passage of a hydraulic control unit comprising;
    a groove type fluid passage formed in a first part is in communication with a groove type fluid passage formed in a second part;
    a plate positioned between the first part and the second part, said plate including a group of small holes formed in the plate for filtering foreign material flowing from the groove type fluid passage formed in the first part to the groove type fluid passage formed in the second part;
    the groove type fluid passage in the second part is in communication with a separate groove type fluid passage in the first part from the groove type fluid passage in the first part via an orifice formed in the plate; and
    the diameter of each small hole in the group of small holes is set to a smaller value relative to the diameter of the orifice.

8. The orifice of a fluid passage of a hydraulic control unit according to claim 7, wherein:
    the hydraulic control unit is a valve body of a hydraulic control unit of an internal combustion engine provided with a hydraulic type automatic transmission; and
    the two parts are adjacent two layer components of layer components forming the valve body.

9. The orifice of a fluid passage of a hydraulic control unit according to claim 7, wherein foreign material in a hydraulic fluid supplied to the hydraulic control unit is retained by said group of small holes to prevent clogging of said orifice.

10. The orifice of a fluid passage of a hydraulic control unit according to claim 7, wherein hydraulic fluid is supplied to the groove type fluid passage in the first part and flows through the group of small holes into the groove type fluid passage formed in the second part for filtering foreign particles from the hydraulic fluid.

11. The orifice of a fluid passage of a hydraulic control unit according to claim 7, wherein the separate groove type fluid passage in the first part is in communication with a solenoid valve for switching a first speed and second speed of a transmission.

12. The orifice of a fluid passage of a hydraulic control unit according to claim 7, and further including a second orifice in communication with a second separate groove type fluid passage and with a solenoid valve for switching a second speed and third speed of a transmission.

* * * * *